(12) United States Patent
Dror et al.

(10) Patent No.: US 8,983,189 B2
(45) Date of Patent: Mar. 17, 2015

(54) METHOD AND SYSTEMS FOR ERROR CORRECTION FOR THREE-DIMENSIONAL IMAGE SEGMENTATION

(75) Inventors: Oranit D. Dror, Rishon Leziyyon (IL); Amir A. Yaakobi, Ramat Gan (IL); Uri U. Einav, Yuvalim (IL); Guy E. Engelhard, Kiryat Ono (IL)

(73) Assignee: Algotec Systems Ltd., Ra'anana (IL)

( * ) Notice: Subject to any disclaimer, the term of this patent is extended or adjusted under 35 U.S.C. 154(b) by 430 days.

(21) Appl. No.: 13/367,704

(22) Filed: Feb. 7, 2012

(65) Prior Publication Data
US 2013/0033419 A1   Feb. 7, 2013

Related U.S. Application Data

(60) Provisional application No. 61/440,571, filed on Feb. 8, 2011.

(51) Int. Cl.
*G06K 9/34* (2006.01)
*G06T 7/00* (2006.01)

(52) U.S. Cl.
CPC ............. *G06T 7/0083* (2013.01); *G06T 7/0097* (2013.01); *G06T 2200/04* (2013.01); *G06T 2207/10072* (2013.01); *G06T 2207/20096* (2013.01); *G06T 2207/20116* (2013.01); *G06T 2207/20161* (2013.01); *G06T 2207/30004* (2013.01)
USPC .......................................................... 382/173

(58) Field of Classification Search
None
See application file for complete search history.

(56) References Cited

U.S. PATENT DOCUMENTS

| 7,668,349 B2 | 2/2010 | Fradkin et al. | |
|---|---|---|---|
| 7,773,786 B2 * | 8/2010 | Fidrich et al. | 382/128 |
| 2003/0174872 A1 * | 9/2003 | Chalana et al. | 382/128 |
| 2008/0091340 A1 * | 4/2008 | Milstein et al. | 701/201 |
| 2008/0139938 A1 * | 6/2008 | Yang et al. | 600/445 |
| 2009/0274350 A1 | 11/2009 | Pavlovskaia et al. | |
| 2013/0033419 A1 * | 2/2013 | Dror et al. | 345/156 |

OTHER PUBLICATIONS

Nils J. Nilsson, Problem Solving Methods in Artificial Intelligence, McGraw-Hill, 1971, Chapter 3, pp. 59-65.

J.A. Sethian, "A fast marching level set method for monotonically advancing fronts," Proc. Natl. Acad. Sci., vol. 93, pp. 1591-1595, Feb. 1996.

J.A. Sethian, "Fast Marching Methods," SIAM Review, vol. 41, No. 2, pp. 199-235, 1999 Society for Industrial and Applied Mathematics.

J.A. Sethian, Level Set Methods and Fast Marching Methods. Evolving Interfaces in Computational Geometry, Fluid Mechanics, Computer Vision, and Materials Science, Cambridge University Press, 1999, Chapters 1-6, 48 pages.

(Continued)

*Primary Examiner* — Tahmina Ansari

(57) ABSTRACT

A method for error correction for segmented three dimensional image data. The method includes receiving segmented three dimensional image data, the segmented three dimensional image data being divided into a plurality of slices; correcting at least one contour of the segmented three dimensional image data on at least one slice according to a command from a user to form a corrected contour; and automatically interpolating a correction represented by the corrected contour to a plurality of slices of the segmented three dimensional image data.

19 Claims, 7 Drawing Sheets

(56) References Cited

OTHER PUBLICATIONS

J.A. Sethian, Website, http://math.berkeley.edu/~sethian/2006/Explanation/fast_marching_explain.html, pp. 1-5, printed on Feb. 15, 2012.

P. Melchoir et al., "Consideration of obstacle danger level in path planning using A* and Fast-Marching optimization: comparative study," Signal Processing, 83, 2003, pp. 2387-2396.

Daniel Livingstone et al., "Fast Marching and Fast Driving: Combining Off-Line Search and Reactive A.I.," 4$^{th}$ International Conference on Intelligent Games and Simulation (Game-On 2003), 2003, 4 pages.

Thomas Deschamps et al., "Fast extraction of minimal paths in 3D images and applications to virtual endoscopy," Medical Image Analysis, 5, 2001, pp. 281-299.

Andrea Schenk et al., "Efficient Semiautomatic Segmentation of 3D Objects in Medical Images", Proc. of Medical Image Computing and Computer-assisted Intervention )MICCA , 2000, Springer, pp. 186-195.

Lu Meng et al., "Interactive Lung Segmentation Algorithm for CT Chest Images Based on Live-Wire Model and Snake Model", 2009 International Conference on Electronic Computer Technology, pp. 461-466.

Eric Mortensen et al., "Intelligent Scissor for Image Composition", Computer Graphics Proceedings, Annual Conference Series, 1995, pp. 191-198.

Thomas H. Cormen et al., *Introduction to Algorithms, Section 25.2, Dijkstra's algorithm*, MIT Press, 1990, pp. 527-531.

Thomas H. Cormen et al., *Introduction to Algorithms*, MIT Press, 2009, Chapter 22, pp. 589-623.

* cited by examiner

METHOD AND SYSTEMS FOR ERROR CORRECTION FOR THREE-DIMENSIONAL IMAGE SEGMENTATION

CROSS REFERENCE TO RELATED APPLICATIONS

This application claims priority to U.S. Provisional No. 61/440,571 filed on Feb. 8, 2011 entitled METHOD AND SYSTEM FOR ERROR CORRECTION FOR THREE-DIMENSIONAL IMAGE SEGMENTATION to Dror et al., incorporated herein in its entirety.

FIELD OF THE INVENTION

The present invention relates to a system and method for the analysis of three dimensional image data and particularly, but not exclusively, to segmentation and error correction of three dimensional objects in images.

BACKGROUND OF THE INVENTION

Image segmentation is the problem of extracting or "segmenting" objects of interest from non-interesting background information in an image. Reliable image segmentation algorithms are required in many fields, particularly for medical images such as CT (computerized tomography) scans, MRI (magnetic resonance imaging) scans, PET (positron emission tomography) scans and the like. For the field of medical image processing, it is important to be able to accurately, rapidly and reliably perform segmentation, as medical diagnoses increasingly rely upon such information.

Fully automatic image segmentation has so far proven to be impractical and unreliable, particularly for three dimensional images such as those which arise from the above described scans. These three dimensional images are provided as a series of two dimensional slices. Image segmentation algorithms must therefore relate to both individual two dimensional slices and to the overall three dimensional construct that is composed of a plurality of such slices. Many of the currently available medical image processing algorithms rely upon a mixture of automated and manual algorithms, which require human interaction with the medical image data.

Interactive image segmentation has therefore become more and more popular among users of medical image data processing software. Many of these semi-automatic tools are prone to errors that require some form of user interaction for correcting them. Such user interaction is often cumbersome, requiring tedious and lengthy operations by the user.

There are two basic types of graph-based segmentation algorithms, which may be used for such interactive image segmentation, including for both medical and non-medical image data: (1) implicit boundary algorithms and (2) explicit boundary algorithms. Implicit boundary algorithms, such as graph cuts or normalized cuts, label each node (pixel) as foreground (i.e., of interest) or background (i.e., not of interest) and imply the boundary between them by the labeling. In contrast, explicit boundary algorithms, such as "livewire" or "intelligent scissors", identify the boundary explicitly and implicitly define a foreground/background labeling.

The livewire method was originally described in a paper by Mortensen and Barret, entitled "Intelligent Scissors for Image Composition" (Computer Graphics Proceedings, Annual Conference Series, 1995, which is hereby incorporated by reference as if fully set forth herein) and balances the benefits of manual intervention with the advantages provided by computer generated boundary points. During intelligent scissors segmentation, a seed point is placed on a boundary edge of a selected object in the image through a manual input of the user to the user interface of software operating according to the intelligent scissors algorithm. During normal operations, the user moves a pointing device along a boundary of the object adding seed points at various locations. As the user continues to move the pointing device, a "live wire" boundary line is established, which is the result of the method, attempting to follow or "snap to" the boundary of the object.

The livewire method relies on Dijkstra's graph search algorithm to find the lowest cost path between a start node, given as the previously placed seed point, and all other nodes in a weighted graph. Specifically, the complete image is represented as a graph with each pixel representing a node and edges representing the connection between one pixel and each of its eight neighboring pixels. The cost of an edge may optionally be calculated so that edges with strong gradients have a lower cost, causing the algorithm to seek or "snap to" strong gradients. On each move of the mouse (or the pointing device), the method seeks the lowest cost path from the previous seed point to the current mouse position. Dijkstra's algorithm is described in Cormen, Leiserson and Rivest, "Introduction to Algorithms", McGraw-Hill.

Once the user places a new seed point, the livewire path from the previous seed point to the new seed point is "frozen" and a new livewire path is now drawn from the newly placed seed point to the current mouse or other pointing device position. As a result, a line, also referred to as a "live wire", is generated and wraps the object by following paths back to the original seed point. The concatenation of the lowest-cost paths between every pair of consecutive placed seed points is the resulting livewire path that wraps the object. Thus, boundary edges are mathematically determined using dynamic programming based on minimal energy comparison techniques.

Many commercially available software programs for image processing of three dimensional medical image data use some variation of the intelligent scissors/live wire algorithm for image segmentation (also known as the "lasso" algorithm). However, since the live wire algorithm is only able to operate in two dimensions, relying solely on this algorithm would mean that in order to fully segment a 3D object the user would have to draw a live wire line on each and every slice belonging to the object. Such an operation is cumbersome and slow so methods have been devised that allow a user to draw contours on a select number of slices and have the remaining slices interpolated over. The interpolation process may not necessarily be a straightforward linear interpolation, but may in fact be a more complex algorithmic procedure taking into account the actual image data. An example of such an algorithmic process may involve the livewire algorithm itself or some deformable contour model.

Some examples of references that relate to continuing a contour line through multiple slices (although not necessarily with livewire) include U.S. Pat. No. 7,668,349 and US2009/0274350, which describe different methods for interpolating such slices. U.S. Pat. No. 7,668,349 allows the user to indicate the correct model shape by drawing a contour on a displayed image of the segmented object of interest, and then to require the system to make the model follow this contour through a plurality of two dimensional slices, after which a three dimensional model may be generated.

US2009/0274350 is directed to image segmentation in generating computer models of a joint by obtaining a plurality of volumetric image slices of the bone and generating a plurality of spline curves associated with the bone. A three dimensional representation of the bone is then generated based upon the spline curve.

The common link to all such algorithms is that they allow the segmentation of objects from scratch. However, many times an automatic, or semi-automatic, tool will be used in order to segment a 3D object and upon review of this object, errors in the segmentation are seen. The previously described programs are not suited for doing error corrections of pre-segmented data.

SUMMARY OF THE INVENTION

The present invention, in at least some embodiments, provides a system and method for creating new segmentation or for error correction of three-dimensional image segmentation that features automatic interpolation. The system and method are optionally suitable for correcting objects segmented according to any image segmentation algorithm, such that the user is not restricted to any particular algorithm for image segmentation. As interpolation is automatic, such interpolation may optionally be performed one or more times during and/or after the error correction process, and is performed in a manner that is transparent to the user, such that the user does not need to actively induce performance of such interpolation.

In at least some embodiments, the present invention also provides a system and method for implicitly correcting planar contours in segmentation, in which the user starts a livewire path from a point on the contour and ends this path on an additional point on the contour. The contour is then modified accordingly.

According to at least some embodiments, there is provided a method for error correction for segmented three dimensional image data, comprising receiving segmented three dimensional image data, said segmented three dimensional image data being divided into a plurality of slices; correcting at least one contour, defining at least one new contour or a combination thereof, of said segmented three dimensional image data on at least one slice according to a command from a user to form a corrected or newly defined contour; and automatically interpolating a correction represented by said corrected or new contour to a plurality of slices of said segmented three dimensional image data.

Optionally, said receiving segmented three dimensional data comprises receiving an orientation for slicing and slicing said three dimensional data into a plurality of slices. Also optionally, said receiving said orientation comprises determining said orientation according to a command from the user. Also optionally said receiving said orientation for slicing and said slicing said three dimensional data is performed after said correcting said at least one contour or defining said at least one new contour. For example, the user may optionally correct a contour and then propagate the correction in an orthogonal direction to the contour correction. A similar process may optionally be performed with a new contour.

Optionally, said correcting said at least one contour of said segmented three dimensional image data according to said command from said user comprises receiving an input contour correction from said user; and correcting said at least one contour from said input contour correction according to a two dimensional contour algorithm. Again, a similar process may optionally be performed with a new contour.

Optionally, said two dimensional contour algorithm comprises a live-wire algorithm.

Also optionally, said interpolating comprises performing any suitable two dimensional segmentation algorithm on a subset of said plurality of slices; and interpolating said subset of plurality of slices to the remaining plurality of slices. Optionally interpolation is only performed over a portion of said plurality of slices, for example optionally by cropping the segmentation so that further slices are not included. Such interpolation may optionally also be extended to additional slices of said plurality of slices, for example optionally by extrapolation or by defining a new contour outside the slice-range of the given segmentation.

Although the present description centers around medical image data, it is understood that the present invention may optionally be applied to any suitable three dimensional image data, including but not limited to computer games, graphics, artificial vision, computer animation, biological modeling (including without limitation tumor modeling) and the like.

According to at least some embodiments of the present invention, interpolation is optionally and preferably performed on selected portions of slices, such that preferably each contour defined by a user (in whole or in part) is not interpolated over but instead is marked as a user defined contour. Interpolation is preferably only performed between user defined contours, such that if the user defined contours are sorted along a direction perpendicular to the direction of the MPR (multi-planar reconstruction), then interpolation is performed over the slices lying between the "adjacent" user defined contours. Additionally, the outlying slices are also optionally defined as user defined contours so that they can be deleted and the extension of the interpolation may optionally be cancelled.

According to at least some embodiments, automatic extrapolation may also optionally be performed in response to user request. The user can request to automatically extend the segmentation, in which case extrapolation is performed from the outlying segmented slices by a few slices, optionally in each direction perpendicular to the direction of the MPR, again preferably maintaining the contour at the boundary of the object as for interpolation. In other words, boundary contours that lie at the edge of the extrapolated area become user contours and are incorporated into the segmentation process.

According to at least some embodiments, the interpolation and extrapolation may optionally be performed by propagating the contour to an adjacent slice, shrinking the contour and then running a deformable model so that the contour is located at the object(s) boundaries.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DESCRIPTION OF EMBODIMENT OF THE INVENTION

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "computer" on a "computer network", it should be noted that optionally any device featuring a data processor and the ability to execute one or more instructions may be described as a computer, including but not limited to any type of personal computer (PC), a server, a cellular telephone, an IP telephone, a smart phone, a PDA (personal digital assistant), or a pager. Any two or more of such devices in communication with each other may optionally comprise a "computer network".

Although the present description centers around medical image data, it is understood that the present invention may optionally be applied to any suitable three dimensional image data, including but not limited to but not limited to computer games, graphics, artificial vision, computer animation, biological modeling (including without limitation tumor modeling) and the like.

At least some embodiments of the present invention are now described with regard to the following illustrations and accompanying description, which are not intended to be limiting in any way.

Figure 1:
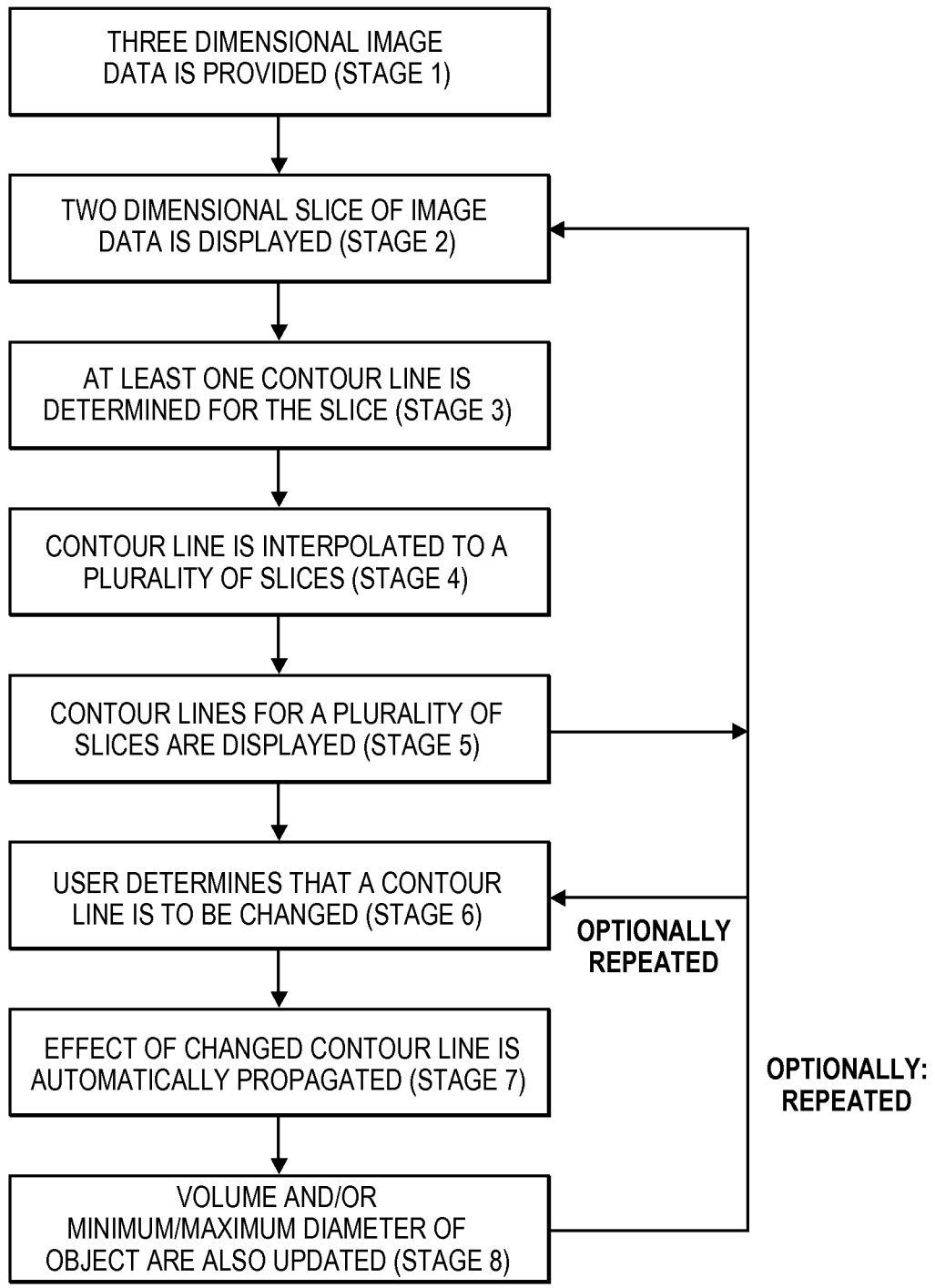
FIG. 1 shows an exemplary, illustrative method for segmentation of a three dimensional image according to at least some embodiments of the present invention.
Figure 5:
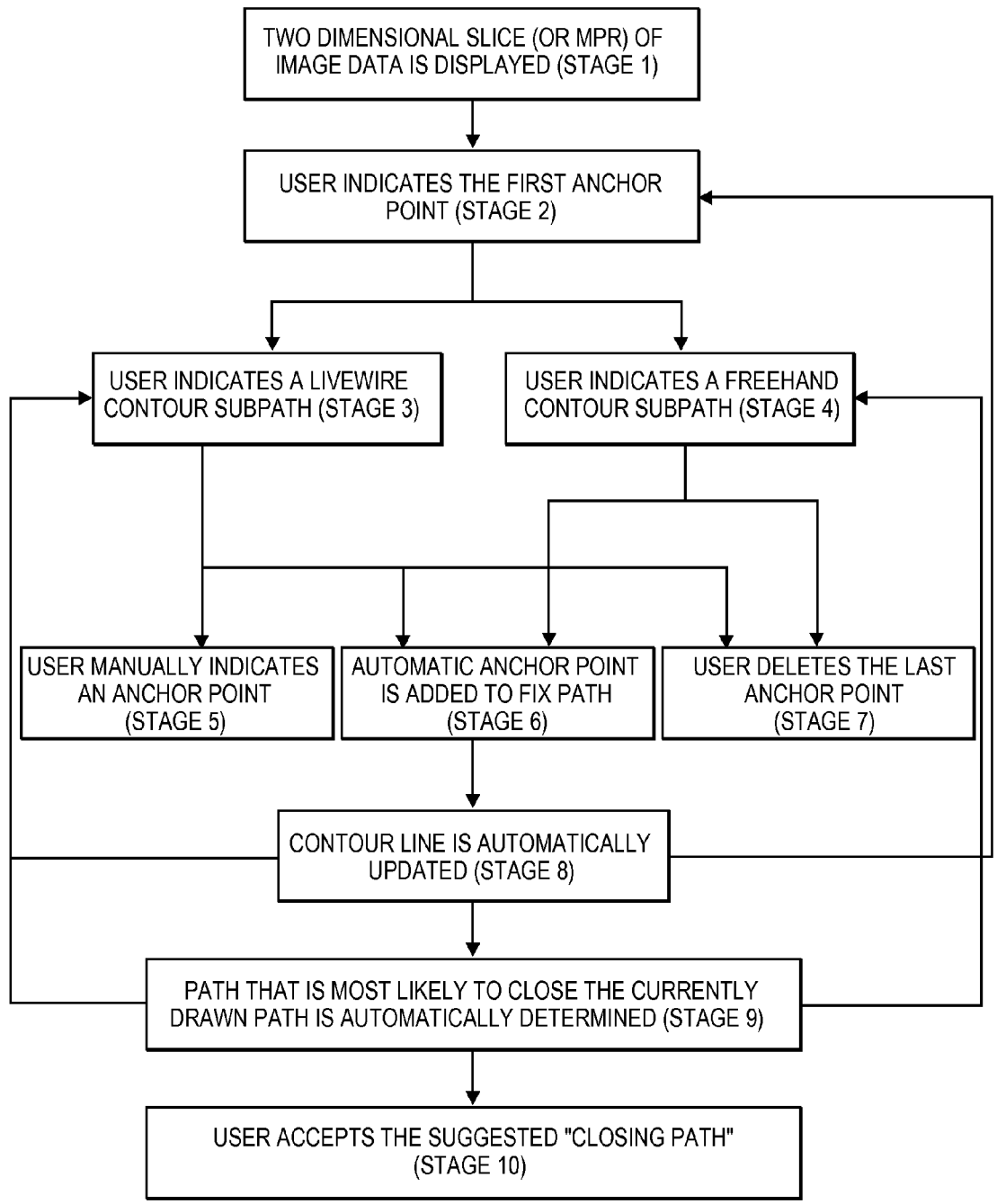
FIG. 5 shows an exemplary, illustrative method for semi-automatic contour line construction according to at least some embodiments of the present invention.

Referring now to the drawings, FIG. 1 shows an exemplary, illustrative method for segmentation according to at least some embodiments of the present invention. As shown, in stage 1, three dimensional image data is provided, comprising a plurality of two dimensional slices. In stage 2, a two dimensional slice of image data is displayed to the user as a two dimensional image through a computational display. Optionally slices are presented in any direction. In stage 3, at least one and preferably a plurality of contour lines are determined for the slice. For example, the user may optionally interactively indicate at least one but preferably a plurality of contour lines on the slice, outlining (or contouring) an object of interest in the two dimensional image. Such a contour line may optionally be indicated through manipulation of a computer mouse or other pointing device. Also optionally or alternatively, the contour line may be indicated automatically (without user intervention) or semi-automatically (with some user intervention). The contour lines may optionally be defined according to the livewire algorithm. FIG. 5 describes an exemplary method for performing stage 3 in more detail according to at least some embodiments of the present invention.

In stage 4, the user defined contour lines are interpolated to a plurality of slices lying between said contours; also optionally, stages 2 and 3 may be performed for a plurality of slices before such interpolation is performed or in parallel to performing such interpolation (although described herein with regard to slices, it should be noted that in fact the method described is suitable for parallel planes, whether slices or MPR (multi-planar reconstruction) planes). Alternatively or additionally, stage 4 may optionally be performed when the user finishes correcting/segmenting the object of interest on at least two slices. An exemplary method describing the interpolation process of stage 4 in more detail according to at least some embodiments of the present invention is given in FIGS. 3 and 4.

In stage 5, the contour lines for a plurality of slices are displayed to the user through a computer display. The user may optionally then direct the method to return to stage 2, in which a two dimensional slice is displayed to the user, and then repeat the following stages.

In stage 6, the user determines that a contour line needs to be changed in at least one slice, whether through alteration or deletion and enters the necessary command to the computer. This process may be accomplished through an exemplary method according to at least some embodiments of the present invention as described in FIG. 6. In stage 7, interpolation is performed between the currently modified contour and the two adjacent user-defined contours (if they exist). The interpolation between a pair of contours is optionally performed according to the method according to at least some embodiments of the present invention as given in FIGS. 3 and 4.

According to at least some embodiments of the present invention, interpolation is optionally and preferably performed on selected portions of slices, such that preferably each contour defined by a user (in whole or in part) is not interpolated over but instead is marked as a user defined contour. Interpolation is preferably only performed between user defined contours, such that if the user defined contours are sorted along a direction perpendicular to the direction of the MPR (multi-planar reconstruction) then interpolation is performed over the slices lying between the "adjacent" contours. Additionally, the outlying slices are also optionally defined as user defined contours so that they can be deleted and the extension of the interpolation may optionally be cancelled.

According to at least some embodiments, extrapolation may also optionally be performed in response to user request or alternatively may optionally be performed automatically (interpolation is preferably performed automatically and is more preferably performed without user intervention). The user can request to extend the segmentation, in which case extrapolation is performed from the outlying slices by a few slices, optionally in each direction, again preferably maintaining the contour at the boundary of the object as for interpolation.

In stage 8, after interpolation, optionally the volume and/or minimum/maximum diameter of the segmented object are also updated, to reflect the updated contour line. The volume is determined according to the volume of one voxel multiplied by the number of voxels in the segmentation (i.e., the number of voxels that have been determined to belong to the object). The minimum/maximum diameters are determined according to a suitable axial direction for the object (i.e., a suitable axial direction for the minimum diameter and a suitable axial direction for the maximum diameter). As the contours of the object are known, it is possible to determine along any slice the largest diameter between boundary voxels of the object.

As shown in the drawing, stages 6-8 may optionally be repeated, for example until the user issues a command to stop. Stages 7 and 8 may optionally be performed each time that stage 6 is performed, after stage 6 has been performed a plurality of times, a combination of these options and so forth, in any non-limiting configuration. Also optionally stage 7 is performed more frequently than stage 8, such that stage 8 is not performed each time that stage 7 is performed. The user may optionally then direct the method to return to stage 2, in which a two dimensional slice is displayed to the user, and then repeat the following stages. The result of stages 7 and 8 may optionally automatically be displayed to the user through the computational display.

The effect of changing a contour line may optionally be determined according to the location of the contour line; certain non-limiting examples are provided herein for the purpose of description only. If the contour line is deleted, and there is only one contour line, then the method preferably returns to the initial stage of displaying a slice to the user, who then begins the process again. If the deleted contour line is the top or bottom contour line, then optionally interpolation to the closest user defined contour line on the parallel plane above or below the deleted contour line is canceled. If the deleted contour line is a mid-contour line, then the image data in the parallel planes between the closest user defined contour lines above and below it is interpolated.

Figure 6:
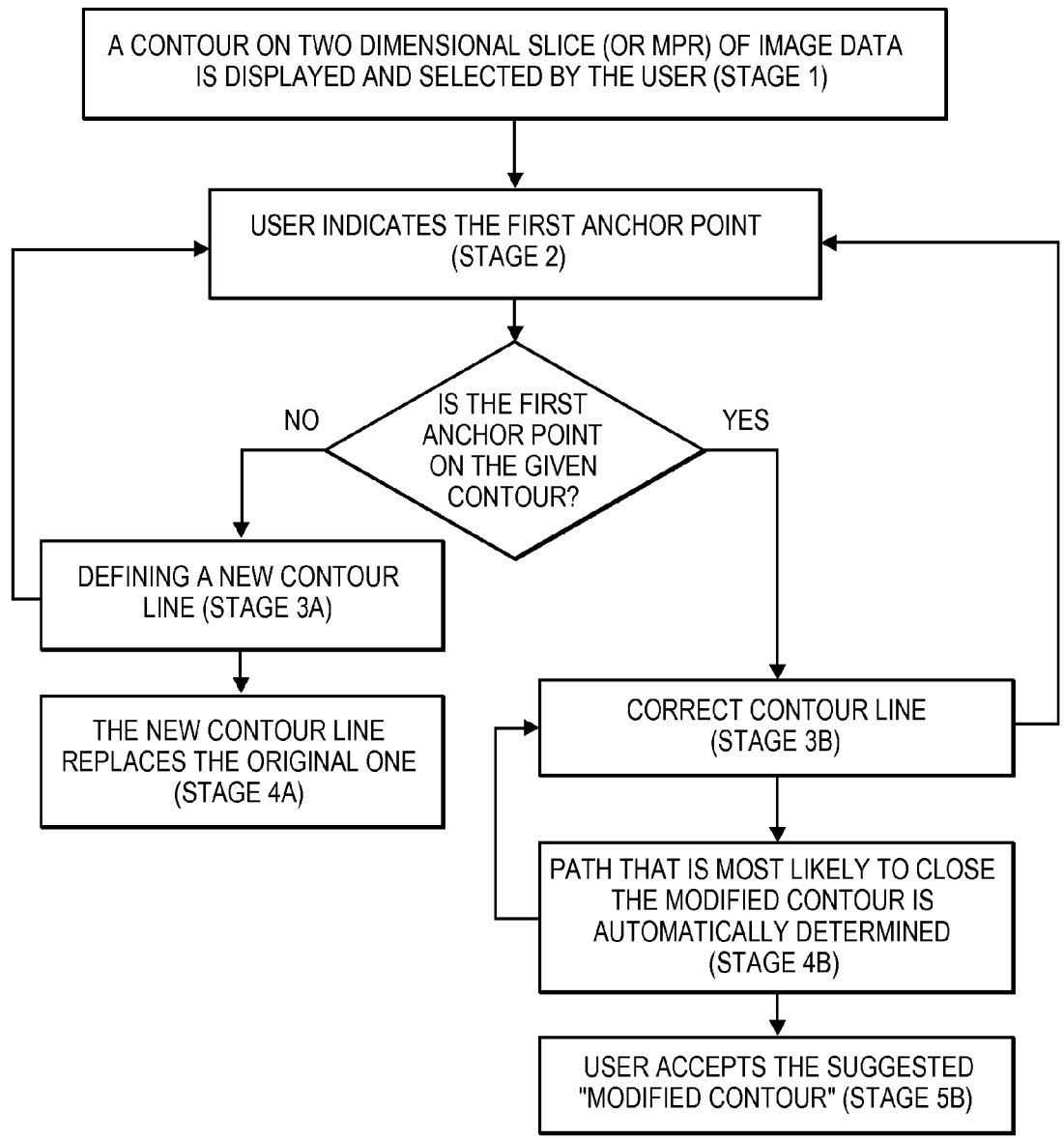
FIG. 6 shows an exemplary, illustrative method for correcting a given contour according to at least some embodiments of the present invention.

Regardless of the source of the contour lines, whether automatic, semi-automatic or manual, and also regardless of the technology or algorithm that determined the contour lines, changes to the contour lines (whether deletions or alterations) are preferably performed according to the modified live-wire algorithm described in FIG. 6.

Any of these stages, or a plurality of these stages, may optionally be repeated to continue image processing until a desired result for the user is reached.

Figure 2:
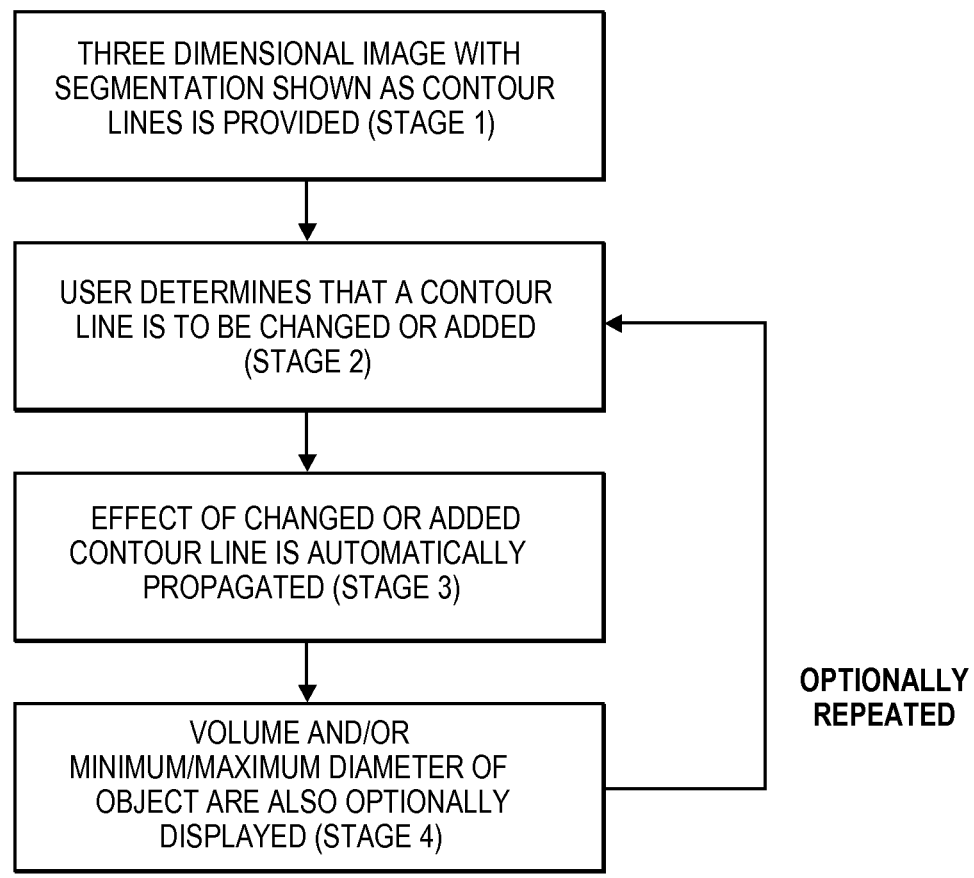
FIG. 2 shows an exemplary, illustrative method for error correction of a three dimensional image segmentation according to at least some embodiments of the present invention.

FIG. 2 shows an exemplary, illustrative method for error correction of an already existing three dimensional image segmentation according to at least some embodiments of the present invention. In stage 1, an image and a presegmented object are provided and displayed to the user. The object is preferably displayed using contour lines on the image. The presegmented object may optionally be provided as described with regard to FIG. 1 and/or FIG. 5, for example and without limitation.

The initial source of the contour lines, before changes are performed as described herein, may optionally be any suitable segmentation algorithm as is known in the art, including but not limited to any suitable explicit boundary algorithm, including but not limited to the live-wire algorithm, the "snakes" algorithm, or the level set algorithm, or any suitable implicit boundary algorithm, including but not limited to graph cuts or normalized cuts.

In stage 2, the user either corrects an existing contour line or adds a new contour line outside of the object.

A non-limiting exemplary method according to at least some embodiments of the present invention for correcting an existing contour line is described in more detail in FIG. 6. A non-limiting exemplary method according to at least some embodiments of the present invention for adding a new contour line is described in more detail in FIG. 5.

In stage 3, the effect of the change (corrected and/or added contour line) is interpolated along the slices to the nearest user defined contour line. In the case of adding a new contour line, the interpolation proceeds in one direction along all of the slices to reach the slices featuring the object. In the case of correction of an existing contour line, the interpolation proceeds in both directions along the slices featuring this contour line, until the nearest user defined contour line is reached. The interpolation proceeds according to the method according to at least some embodiments of the present invention as given in FIGS. 3 and 4.

In stage 4, the volume and minimum/maximum diameters of the object are optionally calculated and shown, as is known in the art. These parameters may optionally already have been calculated in which case they are updated.

Figure 3:
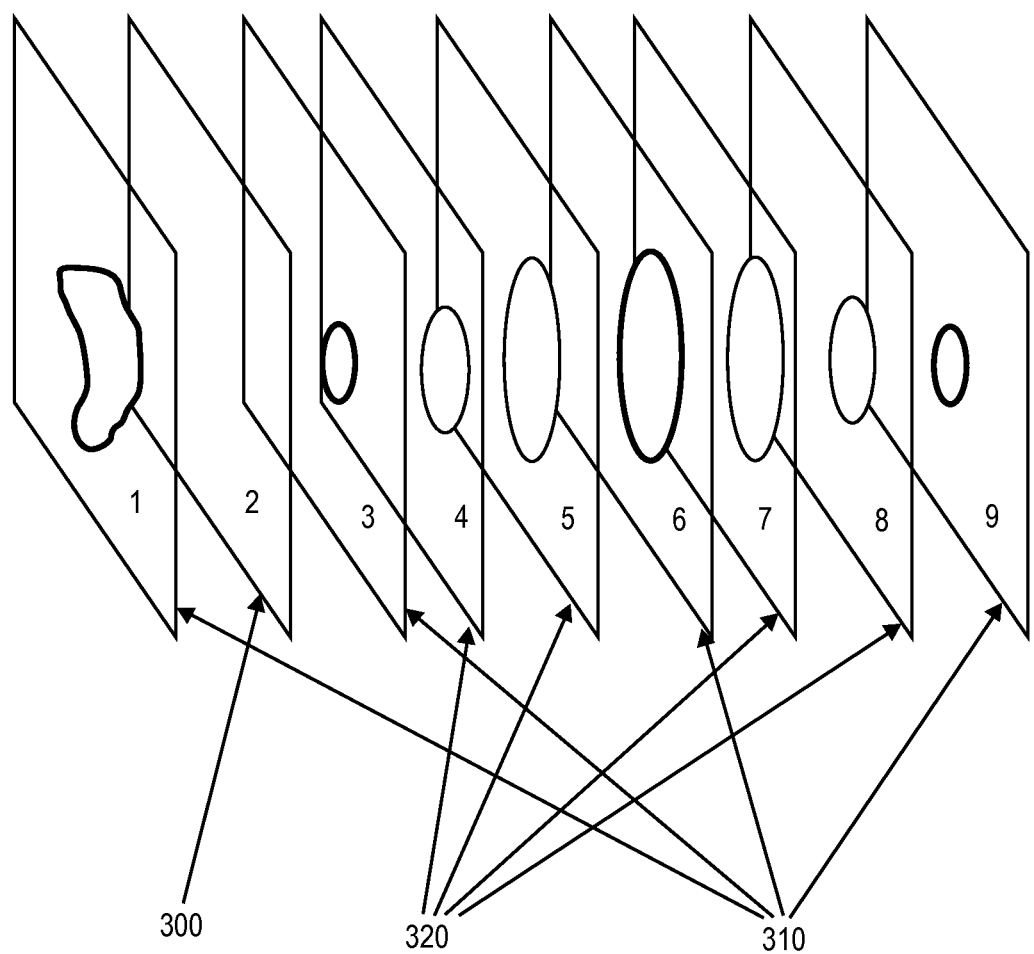
FIG. 3 shows an exemplary illustration of adding a contour to an existing object according to at least some embodiments of the present invention.

FIG. 3 shows an exemplary illustration of adding a contour line to an existing object. This contour line may optionally be added according to the methods of FIGS. 1 and/or 2, for example. An empty slice 300, before interpolation of the contour line, is shown. In this non-limiting example, a single such empty slice 300 is shown (slice 2) but of course a plurality of such empty slices may be present (not shown). By "empty" it is meant that slice 300 does not feature a particular contour line. A plurality of user defined contour lines in slices 310 are also shown (slices 1, 3, 6 and 9), as well as a plurality of interpolated contour lines in slices 320 (slices 4, 5, 7 and 8). In this non-limiting example, only one contour line is drawn per slice; however, the present invention in at least some embodiments is not limited to only one contour line per slice and in fact multiple contour lines per slice may be present.

Figure 4:
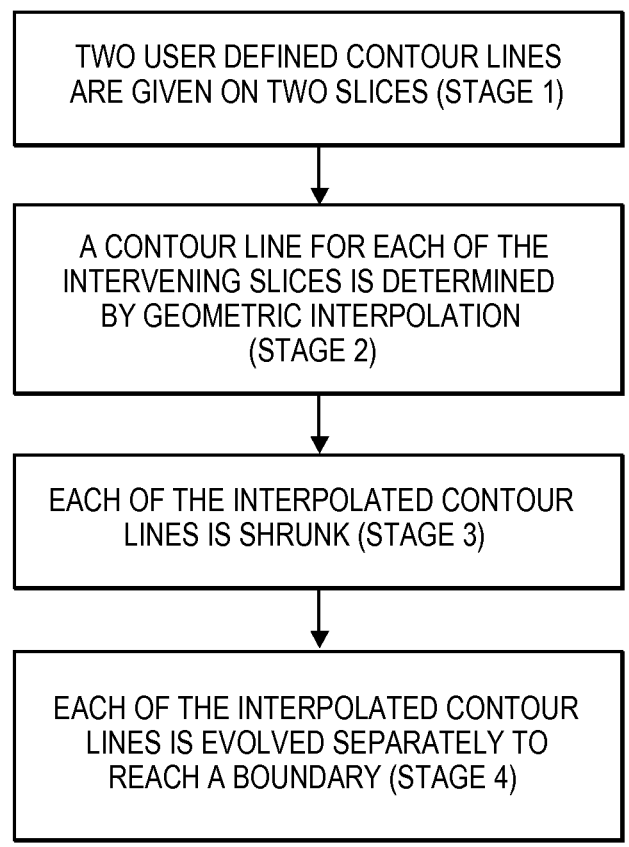
FIG. 4 shows an exemplary, illustrative method for interpolating between two user defined contours according to at least some embodiments of the present invention.

FIG. 4 shows an exemplary, illustrative method for interpolating between two user defined contours according to at least some embodiments of the present invention.

As shown in stage 1, two user defined contour lines are defined on two slices of a provided image. The user defined contour lines may optionally be defined as described above or in any suitable manner. The intensity and gradient magnitude values inside the two contours and along them are learned. The resulting statistics are used in stage 4.

In stage 2, a geometric interpolation method is employed in order to interpolate the shape of one contour line to the shape of the other contour line across the intervening slices.

In stage 3, each geometrically interpolated contour line is shrunk using morphological operations such as erosion. The main force in the level set framework used in the next stage of this method according to at least some embodiments of the present invention is a balloon, which pushes the evolved contour outside. Thus, the initial contour should be internal to the final evolved contour. The erosion radius is proportional to the size of the interpolated contour and its distance from the closest user-defined contours.

In stage 4 each contour line is evolved separately in order to reach the boundary. The level-set method may optionally be employed. The level set mechanism is described in a book by J. A. Sethian, "Level-set Methods and Fast Marching Methods: Evolving Interfaces in Computational Geometry, Fluid Mechanics, Computer Vision and Material Sciences", Cambridge University Press, 1999. The parameters of the level-set mechanism are fined-tuned based on the learned statistics of intensity and gradient magnitude values (as computed in the user-defined contours in stage 1). Employing these statistics, the evolved contour will continue freely at pixels for which the gradient is very small, i.e. around gradient values found inside the learned user-defined contours. In contrast, the evolved contour will stop at pixels for which the gradient is large, i.e. similar to the ones learned along the user-defined contours.

Optionally, stages 3 and 4 are performed on each of the slices separately and therefore may optionally be done in parallel.

Interpolation (in stages 3 and 4) is optionally performed as is known in the art, as described for example in the papers "Semiautomatic Segmentation of 3D Objects in Medical Images" (Schenk et al, in Proc. of Medical Image Computing and Computer-assisted Intervention (MICCAI), 2000, pages 186-195, Springer) and "Interactive Lung Segmentation Algorithm for CT Chest Images Based on Live-Wire Model and Snake Model" (Meng et al, 2009 International Conference on Electronic Computer Technology, page 461 ff), both of which are hereby incorporated by reference as if fully set forth herein.

Schenk combines two-dimensional live wire segmentation and fully-automated shape-based interpolation, as shown in FIG. 2 of Schenk. Schenk also provides a method for optimization of the interpolated contours. Meng uses a combination of the live wire algorithm and the "snake" algorithm, along with contour interpolation, optionally by first having the user input boundaries according to the live wire algorithm, followed by contour interpolation and then by application of the "snake" algorithm, as shown in FIG. 1 of Meng. Of course, other interpolation methods could also optionally be performed as is known in the art.

FIG. 5 shows an exemplary, illustrative method for semiautomatic contour line construction according to at least some embodiments of the present invention, using (as a non-limiting example) the live-wire object contouring paradigm for the basic contouring method, with additional elements according to at least some embodiments of the present invention as described below. This method may optionally be applied for example with regard to stage 3 of FIG. 1 and stage 2 of FIG. 2.

As shown, in stage 1, a two dimensional slice (or MPR—multi-planar reconstruction) of image data is displayed to the user as a two dimensional image through a computational display. In stage 2, the user indicates an anchor point at the boundary of an object of interest in the two dimensional image, for example through manipulation of a computer mouse or other pointing device.

In stage 3, the user indicates a livewire contour subpath around the object of interest, from the anchor point by moving the computer mouse or other pointing device around the object of interest on the two dimensional image displayed on the computer display, causing a live-wire path between the anchor and the current cursor position to follow the object edges. Classically, as described in the background section, the live-wire path is computed according to Dijkstra's algorithm, whereas according to at least some embodiments of the invention it can optionally be determined also by the A*, fast marching, and targeted fast marching algorithms for obtaining more accurate results for following the object boundaries and/or faster processing time.

A* usually solves continuous path problems by converting the problem to a discrete problem defined by a graph and then finding a solution on the graph. The fast marching algorithm solves moving interface type problems in a continuous space by using grid based numerical approximations to the underlying problem and more specifically by numerically solving the associated Eikonal equation. Targeted fast marching (described in U.S. patent application Ser. No. 10/597,221, filed on Dec. 26, 2004 and owned in common with the present application, hereby incorporated by reference as if fully set forth herein) combines the fast marching algorithm with a consideration of the total expected cost to a goal. All of these different methods provide better results than Dijkstra's algorithm for the specific problems of contour line definition, in terms of lower processing time and/or greater accuracy of following the target object boundaries.

The A* and fast marching algorithms are well known in the art. For example and without limitation, A* is described in N. Nilsson, "Problem-Solving Methods in Artificial Intelligence", McGraw-Hill, N.Y., 1971. Fast-marching methods are described in J. A. Sethian, "A fast marching level set method for monotonically advancing fronts", Nat. Acad. Sci. 93(4) (1996) 1591-1595; and in Sethian, "Fast marching methods", SIAM Rev. 41 (2) (1999) 199-235; and in http://math.berkeley.edu/.about.sethian, and in a book by Sethian "Level-sets method and Fast Marching Methods: Evolving Interfaces in Computational Geometry, Fluid Mechanics, Computer Vision and Material Sciences", Cambridge University Press, 1999. Finding paths in 3D images using Fast Marching is described in T. Deschamps and L. D. Cohen "Fast Extraction of Minimal paths in 3D images and application to virtual endoscopy", Medical Image Analysis, Vol. 5, Issue 4, December 2001.

A* and Fast-Marching are compared in P. Melchior et al. "Consideration of obstacle danger level in path planning using A* and Fast-Marching optimization: comparative study", Signal Processing, v.83 n.11 p.2387-2396, November 2003; and in Livingstone et al. "Fast marching and fast driving: combining off-line search and reactive A. I.", 4th International Conference on Intelligent Games and Simulation (GAME-ON 2003), November 2003, UK. All of these references are hereby incorporated by reference as if fully set forth herein.

In stage 4, alternatively or additionally to a livewire subpath, the user may optionally indicate a freehand contour subpath around the object of interest, from the anchor point by moving a pointing device (e.g. moving the computer mouse while keeping the left button pressed down) around the object of interest on the two dimensional image displayed on the computer. This option allows the user to overcome artifactual problems when the livewire algorithm, and hence the defined livewire path, is mistakenly attracted to strong edges of nearby objects at a nearby location around the object.

In stage 5, if the user is satisfied with the currently-indicated contour subpath, he/she may optionally indicate an additional anchor point in order to fix the contour subpath around the object of interest. Optionally stage 5 is performed in combination with stage 4 (freehand drawing). Also optionally, stage 5 is not combined with stage 3 but rather is typically performed after stage 3.

If the currently-indicated contour subpath is a livewire one that is left unchanged for a certain period of time, then in stage 6 an automatic anchor point is added automatically to the two dimensional plane, thereby fixing the path from the previous anchor point to the automatic anchor point. This relieves the user from manually adding an anchor point.

In stage 7, the user may optionally choose to delete the last anchor point through a "hot key" or "quick key" function, for example by pressing the "delete" button on the keyboard. Stages 6 and 7 are optionally performed after stages 3 or 4.

As shown, stages 5-7 are optionally performed in any order and/or in parallel and/or may optionally be performed multiple times, optionally along with repetitions of stages 3 and/or 4.

In stage 8, the overall contour around the object of interest is automatically updated after each addition or deletion of an anchor point, optionally being deleted if there are no anchors. Optionally, stages 2, 3 and/or 4 are repeated after stage 8.

In stage 9, a path between the current position of the computer mouse (or of a pointing device) and the first anchor point that is most likely to close the currently drawn path (and thereby complete contouring around the object) may be automatically determined. Optionally, stages 3 and/or 4 are repeated after stage 9.

In stage 10, the user may optionally determine whether to accept or reject the suggested "closing path".

Any of these stages, or a plurality of these stages, may optionally be repeated to continue image processing until a desired result for the user is reached.

As described above for stage 6 of FIG. 1 and stage 2 of FIG. 2, optionally the method of FIG. 5 may be altered to correct or replace an existing contour (e.g. a contour of an already-segmented three dimensional object or an automatically-interpolated contour). This method, according to at least some embodiments of the present invention, is described in FIG. 6.

Specifically, in stage 1 of FIG. 6, the user optionally views one or more already determined contour lines on a two-dimensional plane (either a slice or an MPR as described above), and then optionally selects which contour line to correct or replace, for example optionally by pressing on a special hot-key.

In stage 2, the user clicks or otherwise selects a point on the two-dimensional image to indicate and initiate the first anchor point. If the anchor point is not on the selected contour, then the method follows the left branch of the diagram. A new contour is defined from scratch in stage 3A, optionally as described in stages 3-10 of FIG. 5, and further optionally with one or more additional deletions and/or additions of anchor points and/or contour lines.

In stage 4A of the left hand branch, the selected contour line is replaced with the newly-defined contour line.

Alternatively, if the first anchor point is on the selected contour, then the method continues with the right hand branch of the diagram and the selected contour line is preferably corrected instead of being replaced by a newly-defined one in stage 3B. After indicating the first anchor point on the selected contour, the correction of the contour line is optionally performed as described stages 3-8 of FIG. 5, where the automatic path closing suggestion in this case would start at the current cursor position (current position of the mouse or other pointing device). The path that is most likely to close the modified contour is preferably automatically determined, more preferably to end at the closest point on the original contour line (stage 4B). In contrast to the automatic path closing suggestion for a newly-defined contour, which ends at the first anchor point and thus completes close-contouring, the automatic path closing suggestion for modifying a given contour does not necessarily end at the first anchor point, but might end on some other point on the original contour and thus on some cases might suggest one of two possibilities for a modified close contour.

In cases where the suggested closing path does not uniquely define a single close contour, heuristics are employed to determine the most-likely contour between the two options (e.g. distance-based heuristics). For example and without limitation, when correcting a contour line, it is possible to draw a new part of a contour line between two points on the old contour line. The new contour line may optionally connect with the old contour line by selecting the connection option which gives a contour line having the largest area. Alternatively or additionally, the image data itself may optionally be used in some way to determine the correct contour line. If the user is not satisfied with the suggestion, he/she can indicate additional anchors and/or contour sub-paths in order to better define the desired modified contour. In stage 5B, the user accepts the suggested modified contour if he/she is satisfied with it.

Figure 7:
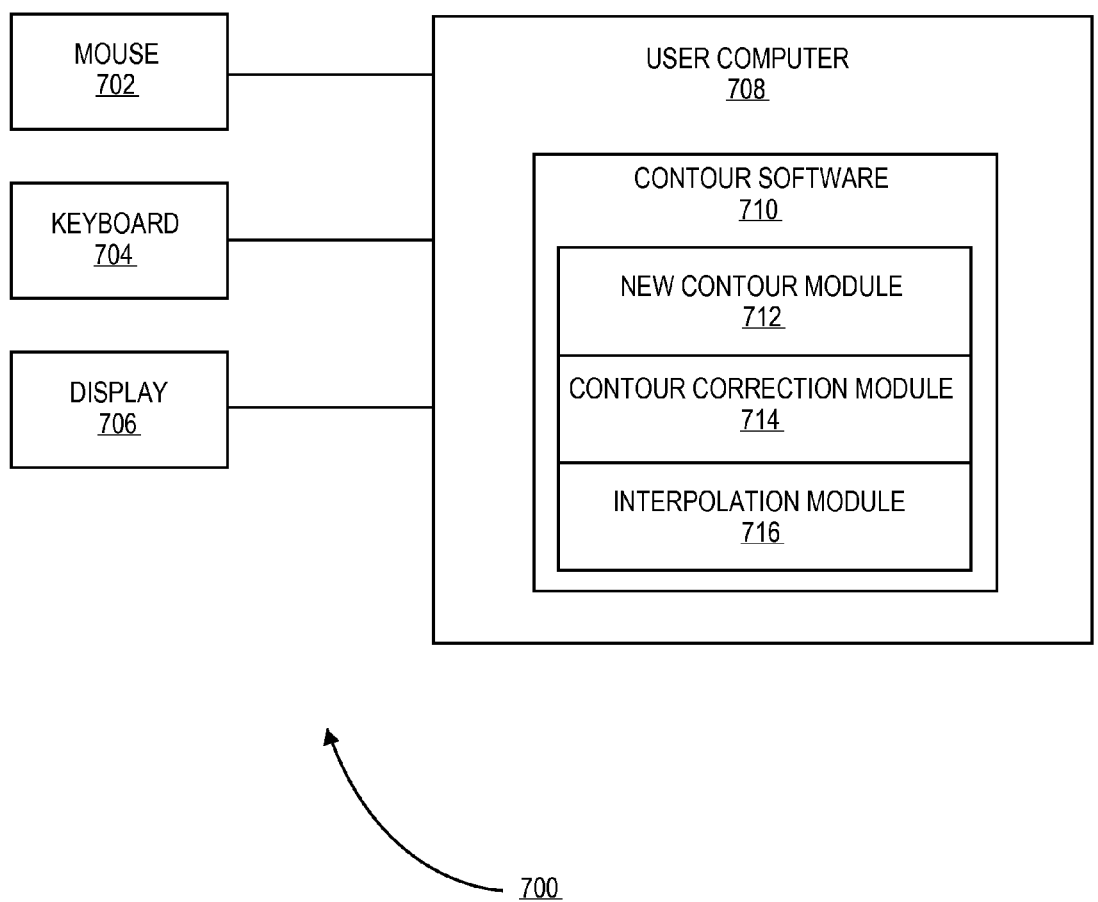
FIG. 7 shows an exemplary, illustrative system for segmentation of a three dimensional image according to at least some embodiments of the present invention.

FIG. 7 shows an exemplary, illustrative system for segmentation of a three dimensional image according to at least some embodiments of the present invention. As shown, a system 700 features a mouse 702 or other pointing device, a keyboard 704 and a display 706. Optionally any of these components may be combined, for example for a touch sensitive display screen; mouse 702 and keyboard 704 may optionally be described as an "input device". The user interacts with these components to perform the various methods as described herein where user interaction is indicated.

System 700 also features a user computer 708, which may optionally comprise any computational device and which may optionally be a local or remote computer, and may optionally be a plurality of computers. User computer 708 operates a contour software module 710, which preferably features a plurality of modules as shown. These modules preferably include a new contour module 712 for determining a new contour line; a contour correction module 714 for correcting a contour line; and an interpolation module 716 for interpolating a contour line across a plurality of two dimensional slices.

As described herein, optionally and preferably new contour module 712 and contour correction module 714 may be implemented according to the art known methods described herein, more preferably according to the inventive variations and implementations described herein. Furthermore optionally both new contour module 712 and contour correction module 714 may feature algorithms adapted only for operation on two dimensional images, such as the livewire algorithm for example.

Without wishing to be limited in any way, a particularly preferred embodiment features implementation of the livewire algorithm for both new contour module 712 and contour correction module 714, preferably according to the inventive variations and implementations described herein, with any of the A*, fast marching or targeted fast marching algorithms, more preferably according to the inventive variations and implementations described herein, for interpolation.

In operation, the user is optionally provided with a plurality of two dimensional slices by user computer 708, of which at least one is displayed by display 706. At least one slice features at least one contour line, whether automatically defined or user defined as described herein. The user then adds a new contour line or corrects a previously provided contour line through interactions with mouse 702 and/or keyboard 704 as described herein. Once the contour line has been successfully defined for at least one slice, it is then propagated to a plurality of slices, and preferably to all slices where the relevant object is present, through the operation of interpolation module 716. The user may then optionally repeat these interactions.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A method for error correction for segmented three dimensional image data, comprising:
   receiving segmented three dimensional image data, the segmented three dimensional image data comprising a plurality of parallel slices;
   correcting at least one contour of the segmented three dimensional image data on at least one slice according to a command from a user to form a corrected contour, wherein the correcting the at least one contour of the segmented three dimensional image data according to the command from the user comprises:
      receiving an input contour correction from the user; and
      correcting the at least one contour from the input contour correction according to a two dimensional contour algorithm;
   automatically interpolating a correction represented by the corrected contour only to the plurality of parallel slices, wherein the automatically interpolating comprises interpolating between the corrected contour and an adjacent user defined contour by applying a geometric interpolation method to interpolate the shape of one contour line to the shape of the other contour line across at least one intervening slice;
   shrinking each geometrically interpolated contour line; and
   evolving each contour line separately to form a final contour line.

2. The method of claim 1, wherein the two dimensional contour algorithm comprises an algorithm selected from the group consisting of a live-wire algorithm, "snakes" algorithm, level set algorithm, and an implicit boundary algorithm.

3. The method of claim 2, wherein the two dimensional contour algorithm comprises the live-wire algorithm.

4. The method of claim 3, wherein the live wire algorithm is computed according to one of A*, fast marching, Dijkstra's algorithm or targeted fast marching algorithms.

5. The method of claim 1, wherein interpolating is automatically performed before, during or after correcting the at least one contour.

6. The method of claim 1, wherein the contour line defines an object, wherein the object is present in the plurality of parallel slices, the method further comprising calculating a volume and/or minimum/maximum diameter of the object.

7. The method of claim 1, wherein shrinking the geometrically interpolated contour line comprises applying an erosion operation to the geometrically interpolated contour line, such that the geometrically interpolated contour line has a boundary within the final contour line.

8. The method of claim 7, wherein evolving each contour line separately to form a final contour line comprises applying a level set method to each contour line.

9. A method for adding a contour line for segmented three dimensional image data, comprising:
   receiving segmented three dimensional image data, the segmented three dimensional image data comprising a plurality of parallel slices and comprising at least one existing contour line displayed on the slices;
   adding at least one new contour line on at least one slice according to a command from a user to form a new contour line, wherein the slice is one of the plurality of parallel slices, wherein adding the at least one new contour line comprises selecting a point by the user outside of the at least one existing contour line, the point forming an anchor point, and defining the new contour line according to the anchor point according to a two dimensional contour algorithm; and
   automatically interpolating the new contour line to the plurality of parallel slices, wherein the interpolating is only performed between the at least one new contour line and the at least one existing contour line.

10. The method of claim 9 wherein automatically interpolating comprises:
   interpolating between the new contour line and the at least one existing contour line by applying a geometric interpolation method to interpolate the shape of one contour line to the shape of the other contour line across at least one intervening slice;
   shrinking each geometrically interpolated contour line; and
   evolving each contour line separately to form a final contour line.

11. The method of claim 9, wherein the two dimensional contour algorithm comprises an algorithm selected from the group consisting of a live-wire algorithm, "snakes" algorithm, level set algorithm, and an implicit boundary algorithm.

12. The method of claim 11, wherein the two dimensional contour algorithm comprises the live-wire algorithm.

13. The method of claim 12, wherein the live wire algorithm is computed according to one of A*, fast marching, Dijkstra's algorithm or targeted fast marching algorithms.

14. The method of claim 9, wherein interpolating between segmentation is automatically performed before, during or after adding the at least one contour line.

15. The method of claim 9, wherein the contour line defines an object, wherein the object is present in the plurality of parallel slices, the method further comprising calculating a volume and/or minimum/maximum diameter of the object.

16. A system for adding or correcting a contour line for segmented three dimensional image data by a user, the system comprising:
   a user computer for receiving the segmented three dimensional image data, the segmented three dimensional image data comprising a plurality of parallel slices;
   a display connected to the user computer for displaying at least one slice of the plurality of parallel slices; and
   an input device for receiving input from a user for correcting or adding the contour line to the at least one slice;
   the user computer further comprising a new contour module for determining a new contour line, or a contour correction module for correcting a contour line, or a combination thereof;

wherein the contour correction module is adapted to respond to a user input command to correct a contour line through the input device by the correcting contour line, such that the user computer automatically interpolates a correction represented by the corrected contour line to the plurality of parallel slices of the segmented three dimensional image data relative to the input contour correction, wherein the automatically interpolating comprises interpolating between the corrected contour line and an adjacent user defined contour line by applying a geometric interpolation method to interpolate the shape of one contour line to the shape of the other contour line across at least one intervening slice; shrinking each geometrically interpolated contour line; and evolving each contour line separately to form a final contour line;

wherein, the new contour module is adapted to respond to a user input command to add a new contour line through the input device by selecting a point outside of at least one existing contour line, the point forming an anchor point, by defining the new contour line according to the anchor point according to a two dimensional contour algorithm; and wherein the user computer automatically interpolates the new contour line to the plurality of slices of the segmented three dimensional image data, wherein the interpolating is only performed between the new contour line and the at least one existing contour line.

17. The method of claim 1, wherein the parallel slices are MPR (multi-planar reconstruction) planes.

18. A method for error correction for segmented three dimensional image data being displayed as a plurality of contours on a plurality of slices, comprising:

receiving segmented three dimensional image data, the segmented three dimensional image data being divided into the plurality of slices;

correcting at least one of the contours of the segmented three dimensional image data on at least one slice according to a command from a user to form a corrected contour, wherein the at least one slice is at least one slice of a plurality of parallel slices; and automatically interpolating a correction represented by the corrected contour only to the plurality of parallel slices, wherein the automatically interpolating comprises interpolating between the corrected contour and an adjacent user defined contour by applying a geometric interpolation method to interpolate the shape of one contour line to the shape of the other contour line across at least one intervening slice; shrinking each geometrically interpolated contour line; and evolving each contour line separately to form a final contour line.

19. A method for adding a contour line for segmented three dimensional image data being displayed as a plurality of contour lines on a plurality of slices, comprising:

receiving segmented three dimensional image data, the segmented three dimensional image data being divided into the plurality of slices with the plurality of contours, wherein the plurality of contour lines are existing contour lines;

adding at least one new contour line on at least one of the plurality of slices according to a command from a user to form a new contour line, wherein the at least one slice is at least one slice of a plurality of parallel slices, wherein adding the at least one new contour line comprises selecting a point by the user outside of at least one existing contour line, the point forming an anchor point, and defining the new contour line according to the anchor point according to a two dimensional contour algorithm; and automatically interpolating the new contour line only to the plurality of parallel slices, and wherein the interpolating is only performed between the at least one existing contour line and the at least one new contour line.

* * * * *